United States Patent
Takahashi

(10) Patent No.: US 8,871,127 B2
(45) Date of Patent: Oct. 28, 2014

(54) METHOD OF PRODUCING A FIBER-REINFORCED RESIN MEMBER

(75) Inventor: Naoyuki Takahashi, Toyoake (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/981,269

(22) PCT Filed: Mar. 8, 2011

(86) PCT No.: PCT/JP2011/055303
§ 371 (c)(1),
(2), (4) Date: Jul. 23, 2013

(87) PCT Pub. No.: WO2012/120628
PCT Pub. Date: Sep. 13, 2012

(65) Prior Publication Data
US 2013/0334734 A1    Dec. 19, 2013

(51) Int. Cl.
*B29C 70/78* (2006.01)
*B29C 70/46* (2006.01)
*B29C 43/18* (2006.01)
*B29C 33/14* (2006.01)

(52) U.S. Cl.
CPC ............... *B29C 43/18* (2013.01); *B29C 70/467* (2013.01)
USPC ............................ 264/278; 264/263; 264/266

(58) Field of Classification Search
USPC .......................................... 264/263, 266, 278
See application file for complete search history.

(56) References Cited

U.S. PATENT DOCUMENTS

| | | | | | |
|---|---|---|---|---|---|
| 2,527,063 | A | * | 10/1950 | Heuer | 264/112 |
| 2,902,721 | A | * | 9/1959 | Heuer | 264/263 |
| 3,813,763 | A | * | 6/1974 | Church | 29/596 |
| 4,334,339 | A | * | 6/1982 | Holly | 425/562 |

(Continued)

FOREIGN PATENT DOCUMENTS

| JP | 04-215772 A | 8/1992 |
|---|---|---|
| JP | 5-85179 A | 4/1993 |

(Continued)

OTHER PUBLICATIONS

International Search Report for PCT/JP2011/055303 dated Jun. 14, 2011.

*Primary Examiner* — Matthew Daniels
(74) *Attorney, Agent, or Firm* — Sughrue Mion, PLLC

(57) ABSTRACT

There is provided a production method that is capable of producing a high-strength fiber-reinforced resin member, wherein the desired orientation is ensured for continuous fibers forming a continuous fiber-reinforced member, as a result of which an appropriate part thereof is reinforced with a continuous fiber-reinforced member that possesses desired physical properties (tensile strength, etc.). It is a method of producing a fiber-reinforced resin member using a mold in which a cavity is defined by closing a lower mold and an upper mold, the mold comprising a groove part formed within the lower mold and that communicates with the cavity, a core slidably provided within the groove part, and a push-up means that pushes the core up, the method comprising: a first step of disposing a continuous fiber-reinforced member on the core; and a second step of charging softened or molten matrix resin into the cavity, pushing up the core with the push-up means to bury the continuous fiber-reinforced member in the matrix resin, and producing a fiber-reinforced resin member in which the continuous fiber-reinforced member is buried in cured matrix resin.

3 Claims, 7 Drawing Sheets

(56) References Cited

U.S. PATENT DOCUMENTS

| | | | |
|---|---|---|---|
| 5,283,103 A | | 2/1994 | Nakai et al. |
| 5,510,074 A | * | 4/1996 | Rose .............................. 264/261 |
| 5,800,763 A | * | 9/1998 | Hoppe et al. ................. 264/255 |
| 6,090,323 A | * | 7/2000 | Izuhara et al. ................ 264/255 |
| 6,176,431 B1 | * | 1/2001 | Hoppe et al. ................. 235/487 |
| 2006/0121251 A1 | * | 6/2006 | Oberacher et al. ............ 428/172 |

FOREIGN PATENT DOCUMENTS

| | | |
|---|---|---|
| JP | 05-261775 A | 10/1993 |
| JP | 6-254984 A | 9/1994 |
| JP | 10-138354 A | 5/1998 |
| JP | 11-198175 A | 7/1999 |
| JP | 2002-355870 A | 12/2002 |
| JP | 2009-73070 A | 4/2009 |

* cited by examiner (a)

(b)

METHOD OF PRODUCING A FIBER-REINFORCED RESIN MEMBER

This is a National Stage Entry of Application No. PCT/JP2011/055303 filed Mar. 8, 2011, the contents of all of which are incorporated herein by reference in their entirety.

TECHNICAL FIELD

The present invention relates to a method of producing a fiber-reinforced resin member.

BACKGROUND ART

Due to their light weight and high strength, fiber-reinforced resin members (fiber-reinforced plastics (FRPs)) obtained by mixing a reinforcement fiber material into resin are used in various industries, e.g., automobile, construction, aviation, etc.

By way of example, with respect to the automobile industry, the above-mentioned fiber-reinforced resin members are employed as structural members of vehicles, e.g., pillars, rockers, underfloor floors, etc., and as non-structural members that require design, e.g., door outer panels, hoods, etc. Attempts have thus been made to produce fuel-efficient and environment-friendly vehicles by ensuring vehicle strength while reducing its weight.

While there are a wide range of methods for molding such fiber-reinforced resin members, one example thereof would be a method in which a sheet molding compound method (SMC method) is applied.

By applying this SMC method, and in order to dispose, for example, a unidirectional continuous fiber-reinforced member (UD member) in the surface of a fiber-reinforced resin member at a location where strength is required in particular, this continuous fiber-reinforced member is temporarily attached to cavity surfaces of upper and lower molds, and molten resin is injected into the cavity. Alternatively, a lump or sheet of molten resin preformed by being pre-heated is disposed within the cavity and pressed. A fiber-reinforced resin member in which the UD member is buried in its surface is thus produced.

However, there is a problem in that, when molding is thus performed within the cavity by temporarily attaching the UD member to the cavity surfaces, the continuous fiber forming the UD member becomes disordered upon molding, as a result of which its orientation is disrupted, making the desired strength difficult to attain. As an example of a method of measuring/evaluating bending amount (offset amount), in the event that the unidirectional continuous fiber F, . . . in FIG. 8 before bending, bends as in FIG. 8*b*, the offset amount of the fiber may be measured and evaluated in a direction perpendicular to the original orientation direction of the fiber (bending amount t mm). Further, according to one finding, when the continuous fiber bends and its angle is consequently offset by 3 degrees, the physical property (tensile strength) of the UD member is known to deteriorate by approximately 10%, or by approximately 50% if it is offset by 12 degrees.

Given the above, Patent Literature 1 discloses an invention in which a recessed part is provided at the boundary between a portion where a unidirectional continuous fiber-reinforced member is to be provided on the surface and all other portions (a protruding part is provided on the cavity surface for the purpose of forming this recessed part), thereby seeking to suppress orientation offset in the continuous fiber forming the continuous fiber-reinforced member.

However, the molded article disclosed in Patent Literature 1 has a problem in that the above-mentioned boundary becomes thinner by an amount corresponding to the recessed part of the cavity, and when an external force acts thereupon, stress is concentrated thereat, making it prone to becoming a fracture origin.

Further, it also has a problem in that, over the course of molding, the continuous fiber-reinforced member temporarily provided on the cavity surface of the upper mold is prone to falling when closing the mold, making it difficult to obtain a molded article with the continuous fiber-reinforced member buried in the surface.

CITATION LIST

Patent Literature

Patent Literature 1: JP Patent Application Publication (Kokai) No. 5-85179 A (1993)

SUMMARY OF INVENTION

Technical Problem

The present invention is made in view of the problems mentioned above. An object of the present invention is to provide a method of producing a fiber-reinforced resin member that is capable of producing a high-strength fiber-reinforced resin member which is given a desired physical property (e.g., tensile strength) of a continuous fiber-reinforced member using a mold that is used for molding a fiber-reinforced resin member for which the desired physical property of a continuous fiber-reinforced member is ensured, wherein orientation offset of a continuous fiber forming the continuous fiber-reinforced member is resolved, and wherein there is no need to provided a recessed part, which becomes a structurally weak part, at a boundary between a portion where the above is buried and all other portions.

Solution to Problem

To achieve the object above, a method of producing a fiber-reinforced resin member according to the present invention is a method of producing a fiber-reinforced resin member using a mold in which a cavity is defined by closing a lower mold and an upper mold, the mold comprising a groove part formed within the lower mold and that communicates with the cavity, a core slidably provided within the groove part, and push-up means that pushes the core up, the method comprising: a first step of disposing a continuous fiber-reinforced member on the core; and a second step of charging softened or molten matrix resin into the cavity, pushing up the core with the push-up means to bury the continuous fiber-reinforced member in the matrix resin, and producing a fiber-reinforced resin member in which the continuous fiber-reinforced member is buried in cured matrix resin.

A mold used in a production method of the present invention comprises a mold in which a groove part exposed to a cavity is formed in a lower mold that forms the mold, in which a core is provided inside the lower mold in a slidable manner, in which a continuous fiber-reinforced member is mounted on the core, and that is capable of pushing this up into the cavity. It makes it possible to press the continuous fiber-reinforced member into the resin with which the interior of the cavity is charged.

In the first step of a production method of the present invention, the continuous fiber-reinforced member is disposed on the core.

Here, there are a multitude of embodiments for the push-up means that pushes the core up, e.g., a feed screw mechanism that carries out a reciprocal motion in the up/down direction by means of an actuator such as a servo motor, etc., and its actuation; a piston rod that carries out a reciprocal motion by means of fluid pressure in a hydraulic cylinder or an air cylinder, or by means of a magnetostrictive actuator or supermagnetostrictive actuator; and so forth.

It may also be of a configuration where a plurality of recessed parts are provided at appropriate places in the lower mold, a core is received in each of the recessed parts, and the plurality of cores are pushed up by a push-up means to bury a plurality of continuous fiber-reinforced members in the thermoplastic resin that is spread inside the cavity.

With the cavity defined by closing the lower mold and the upper mold, a continuous fiber-reinforced member is disposed on the surface of the recessed part in the lower mold, and in the second step, softened or molten thermoplastic resin is charged.

The expression "to charge" as used herein encompasses both injecting molten resin into a cavity, and disposing a lump or sheet of molten resin (a preheated preform) within a cavity. In the latter case, a resin member in the shape of the cavity is molded by, for example, thereafter pressing the upper mold into the lower mold to perform press molding.

It is noted that the thermoplastic resin to be charged may discontinuously contain short fibers and long fibers therein. If the fiber-reinforced resin member to be produced is a structural member of a vehicle, thermoplastic resin containing a fiber material is usually charged.

By using a mold of the present invention, it is possible to charge softened or molten thermoplastic resin into a cavity, actuate a push-up means to push up a continuous fiber-reinforced member after the thermoplastic resin has spread within the cavity, and, further, press this into the thermoplastic resin that is spread within the cavity.

With respect to the terms "softened or molten" regarding thermoplastic resin, if the thermoplastic resin comprises amorphous plastic, the term "softened" is applied to a state where its glass transition point Tg is exceeded, and if the thermoplastic resin is crystalline plastic, the term "molten" is applied to a state where its melting point Tm is exceeded.

Examples of amorphous plastics with extremely low crystallinity, or which never crystallize, may include polystyrene (PS), polyvinyl chloride (PVC), polymethyl methacrylate (PMMA), ABS resin, and thermoplastic epoxy, among others. On the other hand, examples of crystalline plastics with high proportions of crystalline regions in which molecular chains are regularly arranged, that is, those with high crystallinity, may include polyethylene (PE), polypropylene (PP), nylon (PA: nylon 6, nylon 66, etc.), polyacetal (POM), and polyethylene terephthalate (PET), among others.

In addition, examples of continuous fiber-reinforced members may include reinforced members formed entirely of continuous fibers, and reinforced members containing continuous fibers within a matrix resin (prepreg materials). Further, such continuous fiber-reinforced members may be, for example, unidirectional members (UD members) in which a fiber material (continuous fiber) exceeding 50 mm is aligned unidirectionally within a matrix resin as defined by JIS, and they may also be quasi-isotropic members (multiaxial laminated members, fabrics comprising warp threads and weft threads, etc.). Examples of such continuous fibers may include any one of, or a composite comprising two or more of: ceramic fibers such as boron, alumina, silicon carbide, silicon nitride, zirconia, etc.; inorganic fibers such as glass fiber, carbon fiber, etc.; metal fibers such as copper, steel, aluminum, stainless steel, etc.; and organic fibers such as polyamide, polyester, etc.

The continuous fiber-reinforced member mounted on the core is not subjected to any disruption even as the softened or molten thermoplastic resin spreads within the cavity. Accordingly, it is possible to maintain the desired orientation for the continuous fiber forming the continuous fiber-reinforced member.

Further, by pushing the continuous fiber-reinforced member, which comprises continuous fibers for which the desired orientation is maintained, into the softened or molten thermoplastic resin, it is possible to, for example, bury the continuous fiber-reinforced member, which comprises continuous fibers for which the desired orientation is maintained, in the thermoplastic resin.

In so doing, in order to better ensure that the orientation is maintained for the continuous fibers of the continuous fiber-reinforced member located in the lower part of the cavity when the thermoplastic resin is charged, one may take such measures as placing a sheet, which comprises the same thermoplastic resin as the thermoplastic resin to be charged, in tight contact with the surface of the continuous fiber-reinforced member. Further, the mold may be embodied in such a manner that an extremely thin protective plate, which defines a cavity and a groove part and is slidably housed within the lower mold, is provided, the continuous fiber-reinforced member below is protected, when the thermoplastic resin is charged, from the charged thermoplastic resin by the protective plate, the protective plate slides, once the thermoplastic resin has spread sufficiently within the cavity, to expose the continuous fiber-reinforced member to the thermoplastic resin, and the push-up means is actuated to bury the continuous fiber-reinforced member in the thermoplastic resin.

In addition, a heating means may be built into the upper mold or lower mold forming the mold.

With such an embodiment, it becomes possible to soften or melt a lump or sheet of thermoplastic resin by operating the heating means after the mold has been closed with the lump or sheet disposed within the cavity.

A fiber-reinforced resin member produced by, for example, burying a continuous fiber-reinforced member at one desired location, or a plurality of desired locations, and having a thermoplastic resin, i.e., a matrix resin, cure, becomes a high-strength fiber-reinforced resin member in which the desired orientation of the continuous fibers forming the continuous fiber-reinforced member is maintained, and in which the desired physical properties (e.g., tensile strength, etc.) of the continuous fiber-reinforced member are thus ensured. Such a fiber-reinforced resin member may be used not only as structural members of a vehicle that require strength, e.g., pillars, rockers, underfloor floors, etc., but also as non-structural members that require design, e.g., door outer panels, hoods, etc.

With a method of producing a fiber-reinforced resin member of the present invention, it is possible to ensure the desired orientation for the continuous fiber forming the continuous fiber-reinforced member, which improves the strength of fiber-reinforced resin members. Consequently, it is possible to produce a high-strength fiber-reinforced resin member reinforced by the continuous fiber-reinforced member, wherein desired parts possess the desired physical properties (tensile strength, etc.).

Advantageous Effects of Invention

As can be understood from the description above, with a method of producing a fiber-reinforced resin member of the present invention, a lower mold of a mold comprises a groove part facing a cavity, and a core that is slidable within this groove part, and the core is slid after a thermoplastic resin has spread within the cavity, thereby burying a continuous fiber-reinforced member mounted on the core into the thermoplastic resin. Thus, the desired orientation is ensured for the continuous fibers forming the continuous fiber-reinforced member. Consequently, it is possible to produce a high-strength fiber-reinforced resin member reinforced with the continuous fiber-reinforced member, wherein appropriate parts thereof possess the desired physical properties (tensile strength, etc.).

DESCRIPTION OF EMBODIMENTS

Embodiments of a method of producing a fiber-reinforced resin member of the present invention are described below with reference to the drawings. It is noted that FIGS. 1, 3, 4 and 5, in that order, form a flow diagram of a method of producing a fiber-reinforced resin member.

Figure 1:
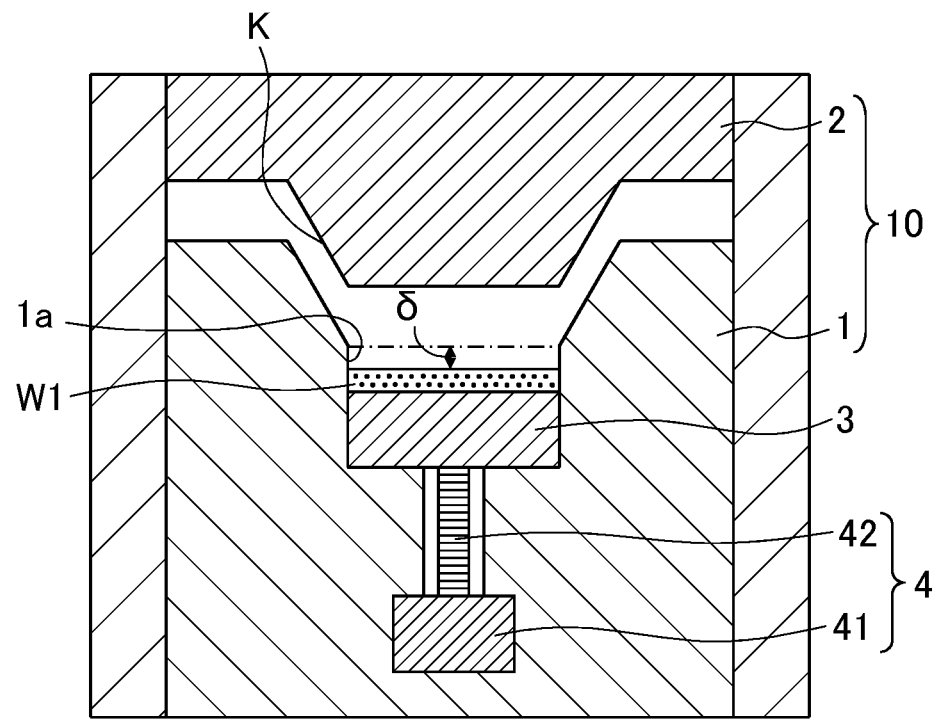
FIG. 1 is a schematic view showing an embodiment of a mold used in a production method of the present invention, and the view shows a state where an upper mold and a lower mold forming the mold are opened.

FIG. 1 is a schematic view showing an embodiment of a mold used in a production method of the present invention, and the view shows a state where an upper mold and a lower mold forming the mold are opened.

Mold 10 shown in the view comprises an upper mold 2 and a lower mold 1. The two are closed to define a cavity K.

A groove part 1*a* that communicates with the cavity K is formed in the lower mold 1. A core 3 is slidably disposed within the groove part 1*a*. The core 3 is pushable upward towards the cavity K above by means of a push-up means 4.

The illustrated push-up means 4 comprises a servo motor 41, and a rotating shaft 42 that rotates by being driven by the servo motor 41. The core 3 is configured to be ascendable/descendable like a feed screw as the rotating shaft 42 rotates.

It is noted that the push-up means is by no means limited to the illustrated example. It may also be so embodied as to comprise an actuator, e.g., a hydraulic cylinder, an air cylinder, a magnetostrictive actuator, a super-magnetostrictive actuator, etc., and a piston rod that carries out a reciprocal motion by means of such actuators, wherein the core is affixed to the piston rod.

In addition, the depth of the groove part 1*a* is such that, when a continuous fiber-reinforced member W1 is mounted on the core 3, the upper surface of the continuous fiber-reinforced member W1 would be located below a virtual bottom surface of the cavity K (the dashed one-dotted line in the diagram) by δ. By thus having the continuous fiber-reinforced member W1 be so mounted within the groove part 1*a* as to sink below the virtual bottom surface of the cavity K, it becomes possible to, when softened or molten thermoplastic resin is charged into the cavity K and spread inside the cavity K, prevent the orientation of the continuous fibers from being disrupted as a result of the thermoplastic resin coming into contact with the continuous fiber-reinforced member W1.

The continuous fiber-reinforced member W1 mounted on the core 3 is buried in the thermoplastic resin that is charged into the cavity K, thereby reinforcing appropriate parts of the ultimately obtained fiber-reinforced resin member. Embodiments thereof may include, as shown in FIG. 2*a*, prepreg materials such as unidirectional members (UD members) in which continuous fibers Wb are unidirectionally aligned within matrix resin Wa, quasi-isotropic members (e.g., 0° directional members, 90° directional members, ±45° directional members, multiaxial laminated members in which a plurality of directional members, such as 0°, 90°, ±45° directional members, etc., are laminated, fabric members comprising warp threads and weft threads, and so forth), etc. In addition, embodiments thereof may also include unidirectional members, quasi-isotropic members, etc., that are made entirely of continuous fibers.

In addition, a further embodiment of the continuous fiber-reinforced member, as shown in FIG. 2*b*, may be such that a sheet Wa' comprising the same thermoplastic resin as the thermoplastic resin to be charged is further provided in tight contact with the upper surface of the continuous fiber-reinforced member W1 shown in FIG. 2*a*. By having the continuous fiber-reinforced member W1 comprises the sheet Wa' on its upper surface, it is possible to better ensure that the orientation of the continuous fibers Wb will be maintained when the thermoplastic resin is charged into the cavity K.

It is noted that examples of the continuous fiber employed may include any one of, or a composite comprising two or more of: ceramic fibers such as boron, alumina, silicon carbide, silicon nitride, zirconia, etc.; inorganic fibers such as glass fiber, carbon fiber, etc.; metal fibers such as copper, steel, aluminum, stainless steel, etc.; and organic fibers such as polyamide, polyester, etc.

Figure 3:
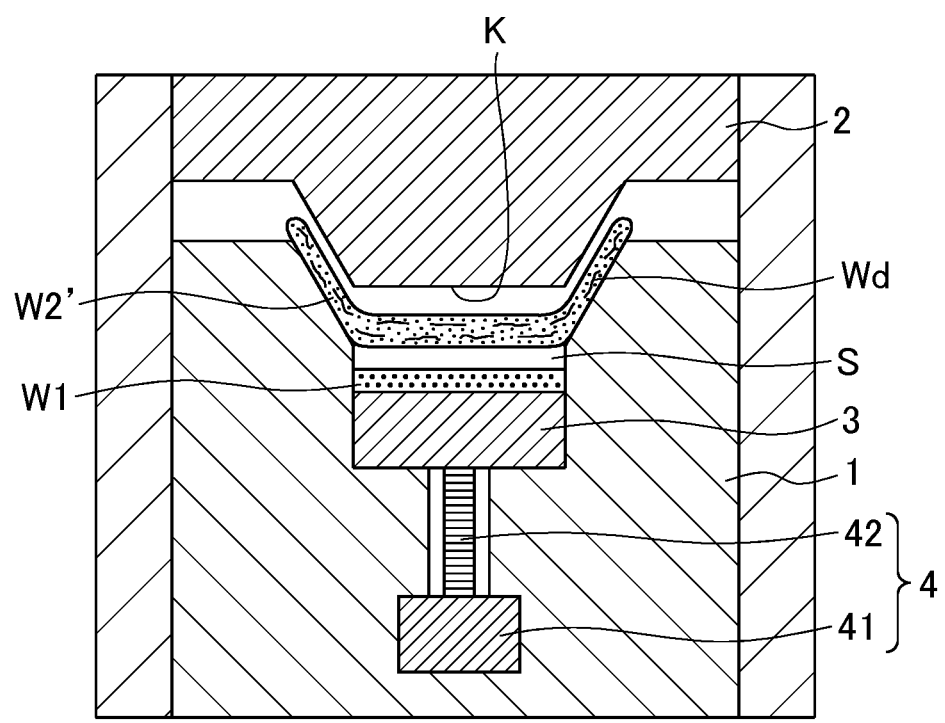
FIG. 3 is a view illustrating a state where a lump of molten thermoplastic resin is received within a cavity.

Once the continuous fiber-reinforced member W1 is mounted on the core 3 as shown in FIG. 1 (step S1), softened or molten thermoplastic resin W2' is then charged into the cavity K as shown in FIG. 3.

Charging may be performed by injecting the softened or molten thermoplastic resin W2' into the cavity K, or by placing a lump or sheet of the softened or molten thermoplastic resin W2' inside the cavity K and subsequently pressing it by pressing the upper mold 2 in, among other methods.

Further, the mold 10 may comprise an unillustrated built-in heating means, e.g., a far-infrared heater, etc., in which case the heating means may be operated after solid thermoplastic resin has been placed inside the cavity K, and the thermoplastic resin may be softened or melted within the cavity K.

There are a wide variety of thermoplastic resins that may be charged. If the thermoplastic resin is to comprise an amorphous plastic, one that is brought above its glass transition point Tg, and thus softened, is charged. If the thermoplastic resin is to comprise a crystalline plastic, one that is brought above its melting point Tm, and thus melted, is charged.

Examples of the amorphous plastic employed may include polystyrene (PS), polyvinyl chloride (PVC), polymethyl methacrylate (PMMA), ABS resin, and thermoplastic epoxy, among others. Examples of the crystalline plastic employed may include polyethylene (PE), polypropylene (PP), nylon (PA: nylon 6, nylon 66, etc.), polyacetal (POM), and polyethylene terephthalate (PET), among others.

If the ultimately obtained fiber-reinforced resin member is a structural member of a vehicle requiring strength, e.g., a pillar, a rocker, an underfloor floor, etc., the thermoplastic resin to be charged would be a fiber resin material comprising short fibers and long fibers of the fiber materials listed above by way of example.

Figure 2:
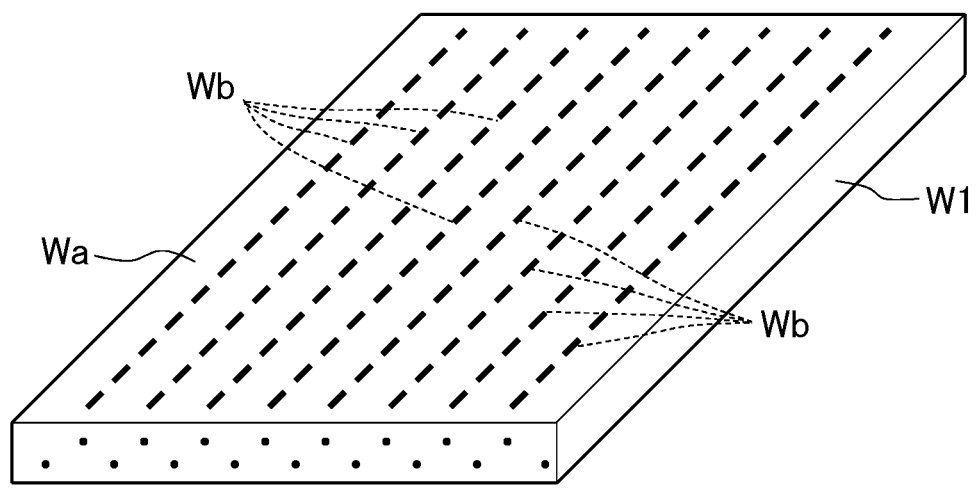
FIG. 2(*a*) is a perspective view showing an embodiment of a continuous fiber-reinforced member, and FIG. 2(*b*) is a perspective view showing another embodiment of a continuous fiber-reinforced member.
Figure 2:
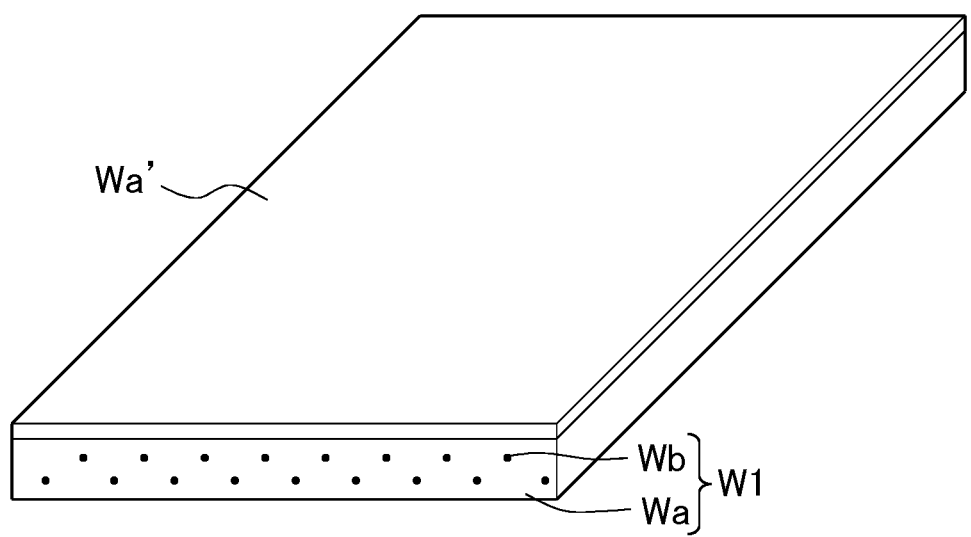

As shown in FIG. 2, with the softened or molten thermoplastic resin W2' received within the cavity K, a gap S is formed between the upper surface of the continuous fiber-reinforced member W1 and the thermoplastic resin W2', thereby restricting contact between the two.

Figure 4:
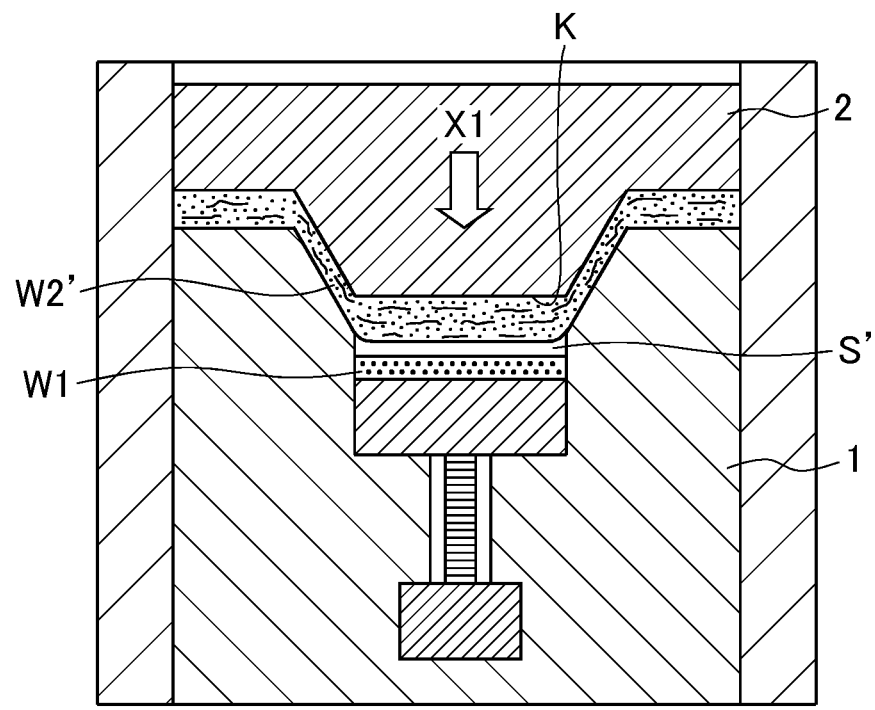
FIG. 4 is a view illustrating a state where an upper mold is pressed into a lower mold to press and spread thermoplastic resin within a cavity.

Next, as shown in FIG. 4, the upper mold 2 is pressed in towards the lower mold 1 (X1 direction) by an unillustrated drive means, thereby spreading the softened or molten thermoplastic resin W2' within the cavity K. It is noted that, even with the thermoplastic resin W2' thus spread within the cavity K, there is still a gap S' between itself and the continuous fiber-reinforced member W1. Consequently, interference between the two is restricted, and the orientation of the continuous fibers Wb is never disrupted.

Figure 5:
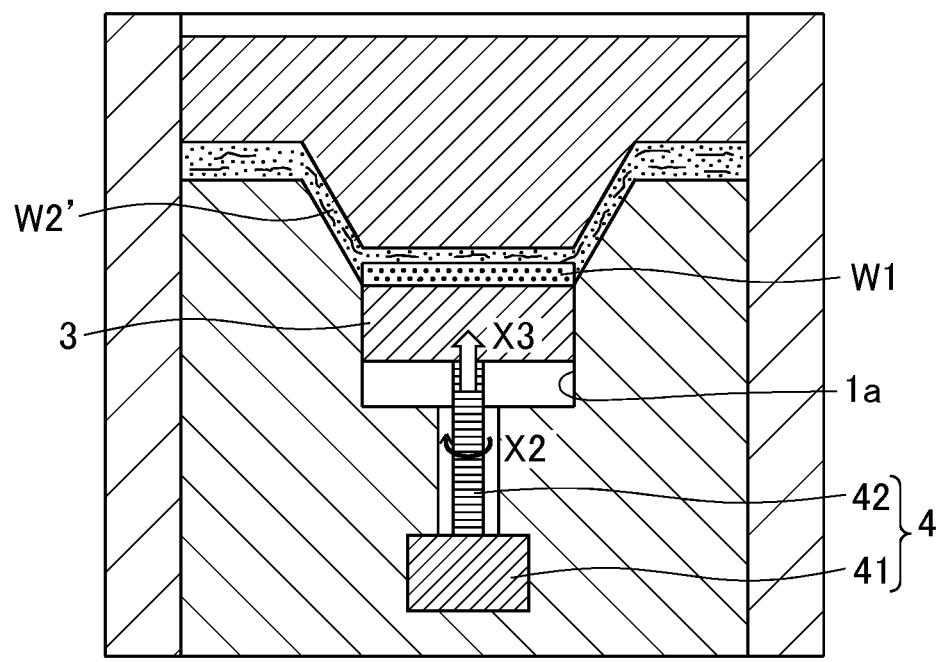
FIG. 5 is a view illustrating a state where a core is pushed up to bury a continuous fiber-reinforced member in thermoplastic resin.

Once the thermoplastic resin W2' has spread sufficiently within the cavity K, the servo motor 41 is actuated as shown in FIG. 5 to rotate the rotating shaft 42 (X2 direction). By raising the core 3 (X3 direction) with the rotation of the rotating shaft 42, the continuous fiber-reinforced member W1 mounted on the core 3 is buried in the thermoplastic resin W2'.

Figure 6:
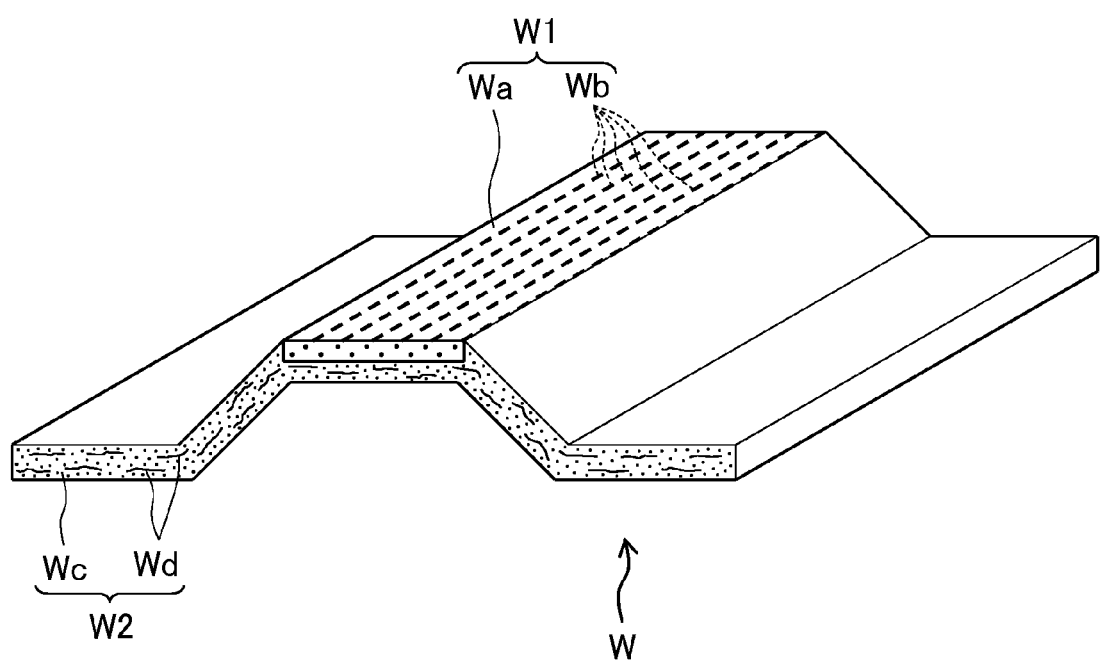
FIG. 6 is a perspective view showing an embodiment of a fiber-reinforced resin member produced.

Once the thermoplastic resin W2' cures, by releasing the molded article by opening the closed mold 10, a fiber-reinforced resin member W is produced wherein the continuous fiber-reinforced member W1 is buried in a portion of a fiber-reinforced resin member in which a fiber material Wd of short fibers or long fibers, etc., is buried within a matrix resin We comprising a thermoplastic resin as shown in FIG. 6 (step S2).

The illustrated fiber-reinforced resin member W is one where a portion of a structural member of a vehicle is reinforced with the continuous fiber-reinforced member W1. It becomes a high-strength fiber-reinforced resin member wherein the desired physical properties of the continuous fiber-reinforced member W1 are ensured by having the desired orientation of its continuous fibers Wb ensured through the above-described production process.

Figure 7:
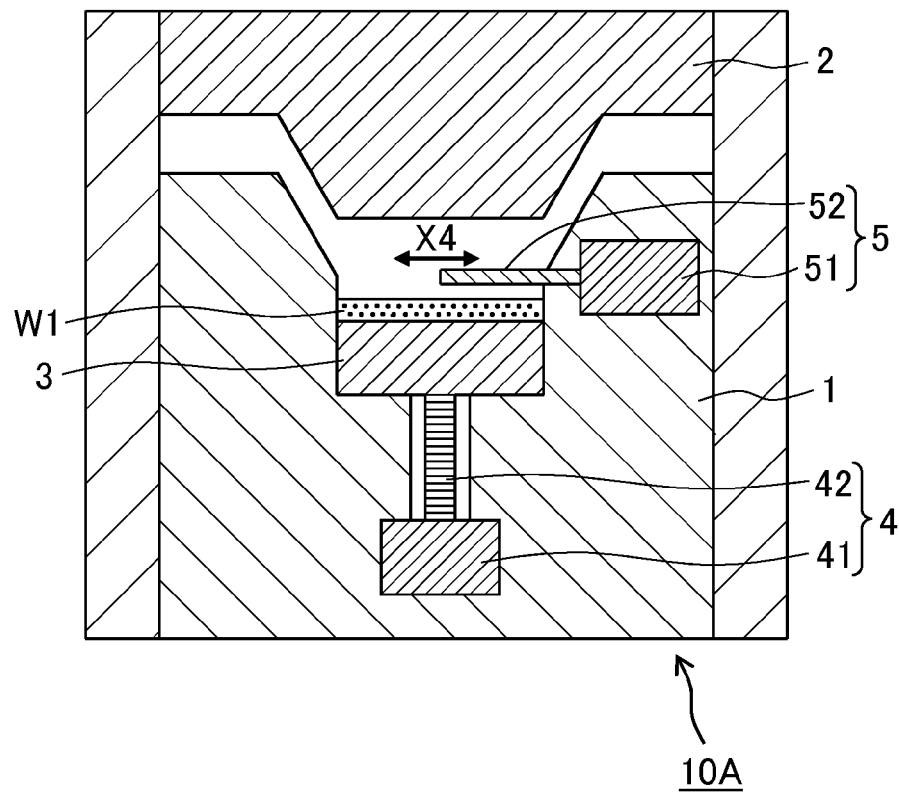
FIG. 7 is a schematic view showing another embodiment of a mold.
Figure 8:
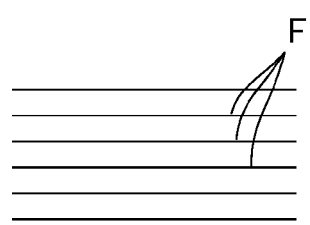
FIG. 8 shows schematic views indicating an example of a method of measuring/evaluating a bending amount (offset amount) for when continuous fibers bend, where (a) is a view indicating a state before bending, and (b) is a view indicating a state after bending.
Figure 8:
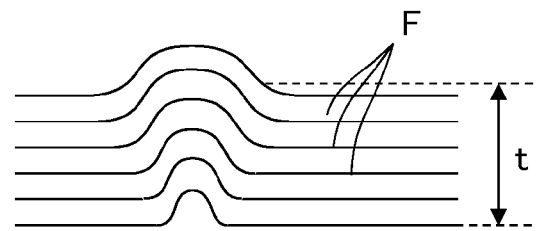

In addition, as a mold to be used in a production method of the present invention, another embodiment as shown in FIG. 7 may be employed.

Mold 10A shown in the view is a mold of such an embodiment that it provides the lower mold 1 with a blocking means 5 comprising a protective plate 52 and a cylinder mechanism 51 that slides it. When charging the thermoplastic resin, the protective plate 52 defines the cavity K and the groove part 1a to protect the continuous fiber-reinforced member W1 from the charged thermoplastic resin. Once the thermoplastic resin has sufficiently spread within the cavity K, the cylinder mechanism 51 is actuated to slide the protective plate 52 (X4 direction) and expose the continuous fiber-reinforced member W1 to the thermoplastic resin. The push-up means 4 is actuated to bury the continuous fiber-reinforced member W1 in the thermoplastic resin.

Experiment Evaluating the Bending Amount of Continuous Fibers Forming a Continuous Fiber-Reinforced Member, and the Results Thereof The present inventors produced fiber-reinforced resin members through a production method of the present invention using a mold comprising the above-mentioned core (Example), as well as fiber-reinforced resin members using a conventional mold without a core (Comparative Example), and conducted an experiment in which bending amounts were measured for the continuous fibers of the continuous fiber-reinforced members buried in both fiber-reinforced resin members.

In this experiment, a UD member (prepreg member) in which a polypropylene matrix resin containing 24 k carbon fiber was used for the continuous fiber-reinforced member. This was pre-heated with a far-infrared heater at approximately 200 to 250° C. for approximately 1 to 10 minutes, and placed within the mold as such.

Next, polypropylene (SUMISTRAN (manufactured by Sumitomo Chemical Co., Ltd.)) melted at 140 to 150° C. was charged into the mold, thereby molding the fiber-reinforced resin members of the Example and the Comparative Example.

The continuous fiber-reinforced member was pressed at 20 MPa or greater within the mold, and the molten matrix resin was pressed at 10 MPa or greater.

Bending amounts were measured with respect to the continuous fibers of the continuous fiber-reinforced members of both the Example and the Comparative Example. The results indicated that, whereas the bending amount was 5 to 10 mm for the continuous fibers of the Comparative Example, the bending amount of the continuous fibers of the Example fell within a range of 0.5 to 1 mm. It has thus been verified that the bending amount of the continuous fibers decreases dramatically, improving it to an extent that it may be evaluated as being substantially free of bending.

Embodiments of the present invention have been described above in detail using the drawings. However, the structure is by no means specifically limited to these embodiments. Design modifications, etc., made within a scope that does not depart from the spirit of the present invention are encompassed by the present invention.

REFERENCE SIGNS LIST

1: Lower mold
1a: Groove part
2: Upper mold
3: Core
4: Push-up means
41: Servo motor
42: Rotating shaft
5: Blocking means
51: Cylinder mechanism
52: Protective plate
10, 10A: Mold
W: Fiber-reinforced resin member
W1: continuous fiber-reinforced member (UD member)
Wa: Matrix resin (thermoplastic resin)
Wa': Protective sheet
Wb: Continuous fiber
W2: Resin member
W2': Molten thermoplastic resin
Wc: Matrix resin
Wd: Discontinuous fiber (short fiber, long fiber)

The invention claimed is:

1. A method of producing a fiber-reinforced resin member using a mold in which a cavity is defined by closing a lower mold and an upper mold, the mold comprising a groove part formed within the lower mold and that communicates with the cavity, a core slidably provided within the groove part, and push-up means that pushes the core up, the method comprising:

a first step of disposing a continuous fiber-reinforced member on the core and covering the continuous fiber-reinforced member with a protective plate which is slidable within the lower mold; and a second step of charging softened or molten matrix resin into the cavity and spreading the matrix resin within the cavity while the continuous fiber-reinforced member is protected from the matrix resin by the protective plate;

sliding the protective plate to expose the continuous fiber-reinforced member;

pushing up the core with the push-up means to bury the continuous fiber-reinforced member in the matrix resin; and curing the matrix resin to produce a fiber-reinforced resin member in which the continuous fiber-reinforced member is buried in cured matrix resin.

2. The method according to claim 1, wherein the continuous fiber-reinforced member comprises one of a reinforced member formed entirely of a continuous fiber, and a reinforced member comprising a continuous fiber within a matrix resin.

3. The method according to claim 1, wherein a short fiber or a long fiber is included in the matrix resin.

* * * * *